United States Patent
Hodgins

(10) Patent No.: US 11,359,741 B2
(45) Date of Patent: Jun. 14, 2022

(54) VALVE DRIVE AND VALVE

(71) Applicant: Buerkert Werke GmbH & Co. KG, Ingelfingen (DE)

(72) Inventor: Micah Hodgins, Ingelfingen (DE)

(73) Assignee: BUERKERT WERKE GMBH & CO. KG, Ingelfingen (DE)

(*) Notice: Subject to any disclaimer, the term of this patent is extended or adjusted under 35 U.S.C. 154(b) by 0 days.

(21) Appl. No.: 17/170,049

(22) Filed: Feb. 8, 2021

(65) Prior Publication Data
US 2021/0246995 A1     Aug. 12, 2021

(30) Foreign Application Priority Data
Feb. 11, 2020 (DE) ...................... 10 2020 103 476.8

(51) Int. Cl.
*F16K 31/06* (2006.01)
*F16K 31/08* (2006.01)

(52) U.S. Cl.
CPC .......... *F16K 31/0682* (2013.01); *F16K 31/08* (2013.01)

(58) Field of Classification Search
CPC ...... F16K 31/08; F16K 31/02; F16K 31/0682; F16K 31/508; F16K 17/06
See application file for complete search history.

(56) References Cited

U.S. PATENT DOCUMENTS

| | | | | |
|---|---|---|---|---|
| 2,286,713 | A * | 6/1942 | Burks | F16K 17/085 137/469 |
| 2,820,604 | A * | 1/1958 | Ray | F16K 31/0658 251/367 |
| 4,834,337 | A * | 5/1989 | Chorkey | F16K 31/0655 251/360 |
| 10,935,019 | B2 | 3/2021 | Krippner et al. | |
| 2001/0035723 | A1* | 11/2001 | Pelrine | H01L 41/193 318/116 |
| 2005/0127316 | A1* | 6/2005 | Pauer | F02M 63/0015 251/129.18 |
| 2015/0369381 | A1* | 12/2015 | Rodegheri | F16K 11/07 137/625.48 |
| 2017/0307094 | A1* | 10/2017 | Choate | F16K 17/06 |
| 2019/0074423 | A1* | 3/2019 | Hodgins | F16K 31/02 |
| 2019/0186482 | A1 | 6/2019 | Krippner et al. | |

FOREIGN PATENT DOCUMENTS

| | | |
|---|---|---|
| DE | 197 08 304 A1 | 9/1998 |
| DE | 10 2017 120 131 A1 | 3/2019 |
| DE | 10 2017 130 199 A1 | 6/2019 |
| DE | 10 2019 101 717 B3 | 7/2020 |
| WO | 2020030507 A1 | 2/2020 |

* cited by examiner

*Primary Examiner* — Umashankar Venkatesan
(74) *Attorney, Agent, or Firm* — McNees Wallace & Nurick LLC

(57) ABSTRACT

A valve drive includes a housing in which a valve actuator with a dielectric elastomer transducer is arranged. A first end of the valve actuator is coupled to an actuating part for actuating a valve element and a second end of the valve actuator is coupled to a holding part, which is mounted in the housing via an adjusting device for adjusting a mechanical pretension of the dielectric elastomer transducer. The adjusting device comprises a single adjusting screw.

12 Claims, 2 Drawing Sheets

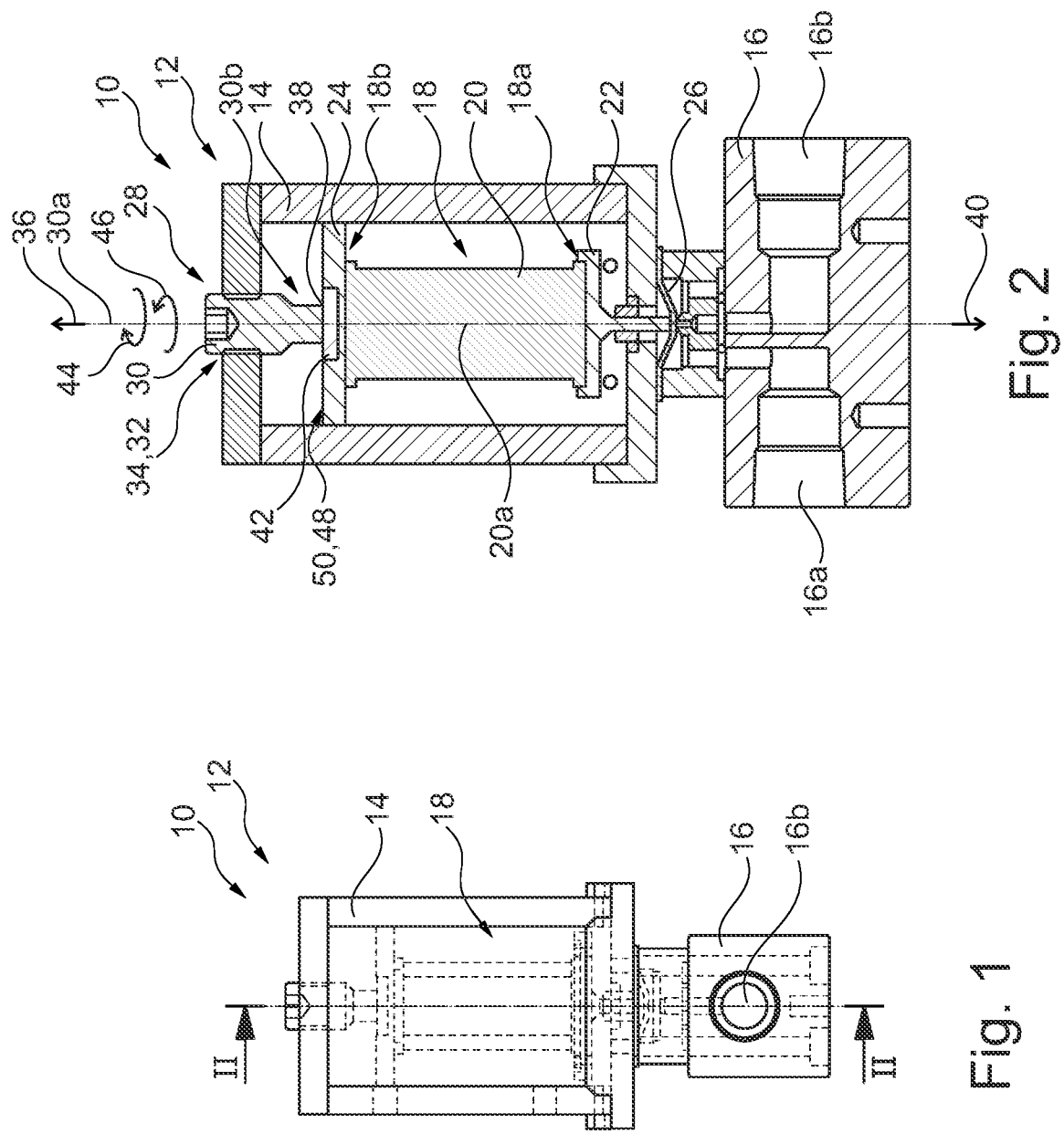

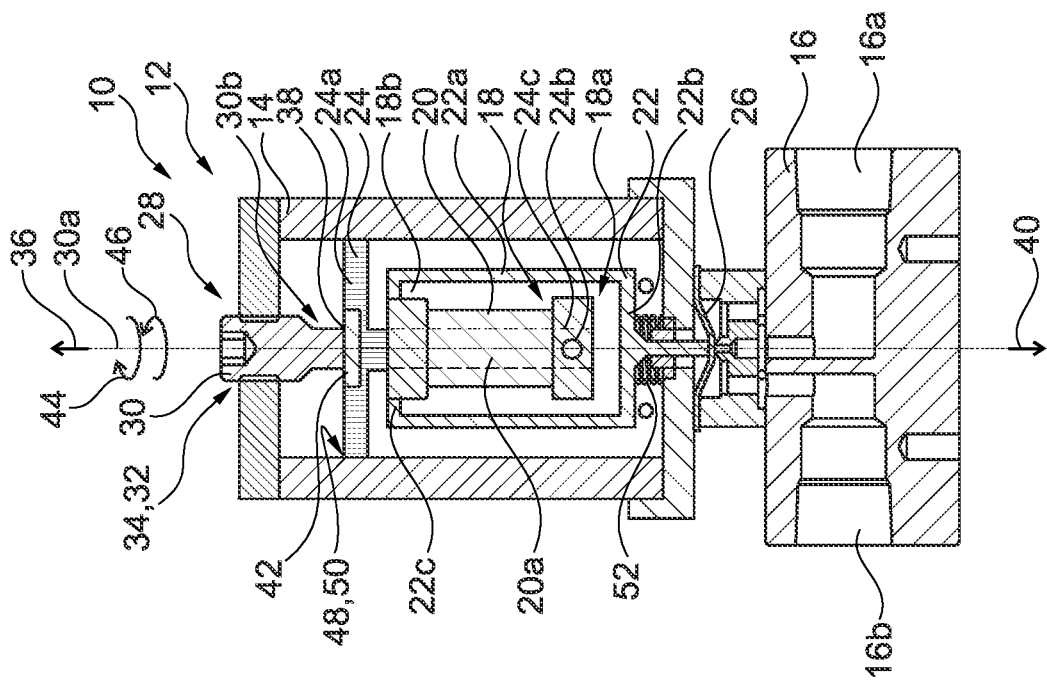
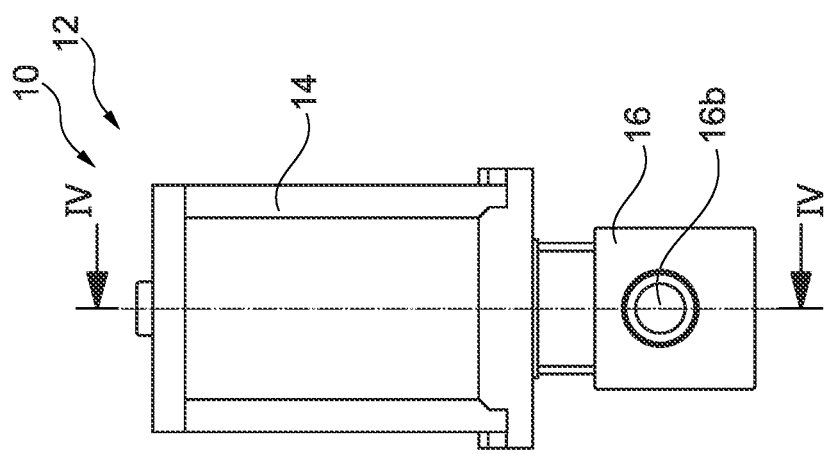

VALVE DRIVE AND VALVE

This invention relates to a valve drive comprising a housing in which a valve actuator with a dielectric elastomer transducer is arranged. The dielectric elastomer transducer operates along an active axis. A first end of the valve actuator is coupled to an actuating part for actuating a valve element. A second end of the valve actuator, which is opposite to the first end, is coupled to a holding part which is mounted in the housing. Moreover, the invention relates to a valve comprising such a valve drive.

BACKGROUND OF THE INVENTION

Such valve drives and valves equipped therewith are known from the prior art.

A dielectric elastomer transducer comprises at least two, typically flat electrodes which are arranged on both sides of a dielectric, i.e. electrically non-conductive elastomer foil. In dependence on the voltage applied between the electrodes, the elastomer foil can be compressed in a defined way, whereby it is lengthened correspondingly while maintaining its volume, and the electrodes approach each other. The dielectric elastomer transducer hence converts electric energy into mechanical work. Due to the use of an elastomer foil, dielectric elastomer transducers frequently are also referred to as foil transducers or more generally as an electroactive composite structure. Dielectric elastomer transducer frequently have a strip-shaped design. They can also be referred to as actuator strips. In this connection, elastomer transducers can have a single-layer or multilayer structure, i.e. comprise one or more layers with one pair of electrodes each and an associated elastomer foil. Either the approaching of the electrodes or the lengthening of the elastomer foil can be utilized as an actuation mechanism.

To enable a valve to be actuated precisely by means of an elastomer transducer, the same must be adjusted exactly to the geometrical conditions within the valve drive, in particular as regards its dimensions along the active axis. This applies in particular for the distance between the holding part and the actuating part. Such an adjustment always involves a certain expenditure.

Therefore, it is the object underlying the invention to improve a valve drive as mentioned above to the effect that the elastomer transducer can easily and precisely be adjusted to the geometrical conditions within the valve drive. Thereby, a reliable and precise actuation of a valve coupled to the valve drive also is to be achieved.

BRIEF DESCRIPTION OF THE INVENTION

The object is achieved by a valve drive as mentioned above, in which the holding part is mounted in the housing via an adjusting device for adjusting a mechanical pretension of the dielectric elastomer transducer. The adjusting device comprises a single adjusting screw. The adjusting device hence serves to mount the dielectric elastomer transducer in the housing. In particular manufacturing and assembly tolerances of the valve drive can be compensated thereby. Due to the defined pretension of the dielectric elastomer transducer, a fast and reliable response of the valve drive is achieved. A valve coupled to the valve drive can also be actuated thereby quickly and precisely. The pretension merely is adjusted via a single adjusting screw. This is particularly easy.

Preferably, a middle axis of the adjusting screw substantially coincides with the active axis of the dielectric elastomer transducer. Hence, the mechanical pretension is centrally introduced into the dielectric elastomer transducer by the adjusting screw. This results in a uniform pretension. For this reason, the valve drive operates reliably and is durable.

Moreover, the holding part can be shiftably mounted with respect to the housing via a sliding guideway. Thus, the holding part is reliably guided on the housing. In particular, this prevents the holding part from wedging or jamming in an undesirable way. Likewise, a sliding guideway generally operates with low friction. Consequently, the dielectric elastomer transducer can be pretensioned easily and precisely.

Preferably, the sliding guideway acts as an anti-rotation protection for the dielectric elastomer transducer. Thus, it is systematically excluded that the dielectric elastomer transducer is twisted in an undesirable way. On the hand, a high reliability and a long service life of the elastomer transducer is achieved thereby. On the other hand, a valve associated with the valve drive can be actuated extremely precisely.

According to one embodiment, the adjusting screw cooperates with the housing via a thread. For adjustment, the adjusting screw hence is rotated. This can be effected by means of a standard tool. In addition, such a rotation can be carried out with high precision. Via the thread, the rotary movement also is converted into a translational movement. Depending on the pitch of the thread, also comparatively small translational movements can thus be generated in a defined way. As a result, a pretension of the elastomer transducer can be adjusted very precisely.

In addition, the holding part can rest against the adjusting screw in a first direction, which is oriented along the active axis of the dielectric elastomer transducer. In particular, the first direction corresponds to a direction of pretension of the dielectric elastomer transducer. Hence, the holding part is precisely mounted on the adjusting screw and hence on the housing in the first direction.

Alternatively or additionally, the holding part can be magnetically connected to the adjusting screw in a second direction, which is oriented along the active axis of the dielectric elastomer transducer. In particular, the second direction is opposite to the first direction and the direction of pretension of the dielectric elastomer transducer. Hence, the holding part is precisely mounted on the adjusting screw and hence on the housing also in the second direction. In particular, a relative rotation between the adjusting screw and the holding part is maintained.

Hence, as the holding part is precisely mounted both in the direction of pretension and against the direction of pretension, an exact and precise position of the same within the housing is obtained. This also results in a precise position of the elastomer transducer within the valve drive.

According to one variant, the adjusting screw comprises a magnetizable portion. The holding part comprises a permanent-magnetic portion, or a permanent-magnetic connecting element is attached to the holding part. The permanent-magnetic portion or the connecting element is magnetically connected to the magnetizable portion. Alternatively, the adjusting screw comprises a permanent-magnetic portion. Then, the holding part comprises a magnetizable portion or a magnetizable connecting element is attached to the holding part, wherein the permanent-magnetic portion is magnetically connected to the magnetizable portion or the connecting element. In this connection, a permanent-magnetic portion or a permanent-magnetic connecting element is understood to be a portion or a connecting element from which a magnetic field extends. In a basic state, however, no magnetic field extends from a magnetizable portion or a magnetizable connecting element. Such portions or connecting elements, however, have the property that as a result of a magnetic field externally acting on the same, which for example extends from a permanent-magnetic portion or a permanent-magnetic connecting element, they can be magnetized in such a way that they adhere to the permanent-magnetic portion or the permanent-magnetic connecting element. Hence, in both alternatives the holding part is magnetically retained at the adjusting screw. For the case that a connecting element is used, the same can be glued to the holding part or be connected to the holding part via other suitable fastening means. The magnetic attachment acts along the active axis of the elastomer transducer precisely and reliably. At the same time, a relative rotation between the adjusting screw and the holding part is possible.

Preferably, the magnetizable portion or the magnetizable connecting element is a ferromagnetic portion or a ferromagnetic connecting element.

The adjusting screw can be made of a magnetic material, in particular of a magnetic metal. The metal can have ferromagnetic properties. In particular, the adjusting screw is made of a magnetic steel.

The object is also achieved by a valve as mentioned above, which comprises a valve drive according to the invention. Due to the effects and advantages described already with regard to the valve drive, such a valve can be actuated with high precision and speed. The simple construction of the valve drive has an impact on the valve so that the same also is of simple construction.

BRIEF DESCRIPTION OF THE DRAWINGS

The invention will be explained below with reference to two exemplary embodiments that are shown in the attached drawings, in which:

FIG. 1 shows a valve according to the invention with an inventive valve drive according to a first embodiment, FIG. 2 shows the valve of FIG. 1 in a sectional representation along the plane II-II, FIG. 3 shows a valve according to the invention with an inventive valve drive according to a second embodiment, and FIG. 4 shows the valve of FIG. 3 in a sectional representation along the plane IV-IV.

DETAILED DESCRIPTION OF THE INVENTION

FIGS. 1 and 2 show a valve 10 with a valve drive 12.

The valve drive 12 comprises a housing 14 which can also be referred to as an actuator housing.

The valve 10 also includes a valve housing 16 on which fluid ports 16a, 16b are provided, which selectively can be connected in a fluid-conducting manner or can be fluidically separated from each other by actuating the valve 10.

For this purpose, a valve actuator 18 is provided within the housing 14, which includes a dielectric elastomer transducer (briefly: elastomer transducer) 20.

A first end 18a of the valve actuator 18 is connected to an actuating part 22, and a second end 18b of the valve actuator 18 is connected to a holding part 24.

The actuating part 22 is movably mounted in the housing 14 along an active axis 20a of the elastomer transducer 20 and is coupled to a valve element 26 which in the illustrated exemplary embodiment is a membrane.

The holding part 24 is mounted within the housing 14. In particular, in operation of the valve 10 the holding part 24 is immovable along the active axis 20a.

FIGS. 1 and 2 show the valve 10 in its closed state, wherein the valve actuator is not energized.

The valve actuator 18 is designed as a so-called stack actuator, which is shortened along its active axis 20a when it is energized.

The valve 10 hence is a so-called normally closed (NC) valve.

The holding part 24 is mounted in the housing 14 via an adjusting device 28.

The adjusting device 28 comprises a single adjusting screw 30 whose middle axis 30a coincides with the active axis 20a of the elastomer transducer 20.

The adjusting screw 30 cooperates with the housing 14 via a thread 32. More exactly, the thread 32 is an external thread of the adjusting screw 30. The same cooperates with an internal thread 24 that is provided on the housing 14.

The holding part 24 rests against an associated end face 38 of the adjusting screw 30 in a first direction 36, which is oriented along the active axis 20a of the elastomer transducer 20 and in an associated direction of pretension.

In the representation of FIG. 2, the holding part 24 hence is prevented from an upward movement, as it rests against the end face 38.

In a second direction 40, which is opposite to the first direction 36 and thus is directed against a direction of pretension of the elastomer transducer 20 along the active axis 20a of the elastomer transducer 20, the holding part 24 is magnetically retained at the adjusting screw 30.

In the illustrated embodiment, a permanent-magnetic connecting element 42 therefor is attached, in particular adhesively bonded to the holding part 24.

The adjusting screw 30 is made of a magnetizable material, in the present case of a ferromagnetic steel.

It will be appreciated that for magnetically fixing the holding part 24 to the adjusting screw 30 it is also sufficient when the adjusting screw 30 includes a magnetizable portion 30b, which faces the holding part 24, and otherwise is non-magnetizable.

The adjusting device 28 serves to adjust a mechanical pretension of the elastomer transducer 20.

In this connection, by turning the adjusting screw 30 into the housing 14, which is symbolized by means of an arrow 44, it is effected that due to its abutment against the end face 38 of the adjusting screw 30, the holding part 24 is moved in the direction of the actuating part 22, i.e. in the second direction 40. In this way, a pretension of the elastomer transducer 20 is reduced.

When the adjusting screw 30 is rotated in an opposite direction, which is symbolized by an arrow 46, the end face 38 moves upwards in the drawing of FIG. 2.

Since the holding part 24 magnetically adheres to the adjusting screw 30 via the connecting element 42, the holding part 24 thereby is also moved away from the actuating part 22. Thus, a pretension of the elastomer transducer 20 is increased.

It will be appreciated that the magnetic holding force always is greater than all other forces acting on the holding part 24 along the active axis 20a, in particular as a force resulting from the pretension of the elastomer transducer 20. Thus, the holding part 24 always adheres to the adjusting screw 30 along the active axis 20a.

The holding part 24 additionally is shiftably mounted with respect the housing 14 via a sliding guideway 48.

This sliding guideway 48 furthermore acts as an anti-rotation protection 50 for the elastomer transducer 20. Hence, the pretension of the elastomer transducer 20 is adjusted without twisting the same in itself.

A valve 10 according to a second embodiment is shown in FIGS. 3 and 4. In the following, merely the differences to the first embodiment will be discussed. Identical or mutually corresponding components accordingly are designated with the same reference numerals.

Compared to the first embodiment of the valve 10, the valve actuator 18 now is connected differently.

In this connection, the holding part 24 substantially is T-shaped.

A holding part base 24a is shiftably mounted in the housing 14 via the sliding guideway 48, which at the same time acts as an anti-rotation protection 50.

A pin-shaped holding tab 24b centrally extends from this holding part base 24a.

In the representation of FIG. 4, it extends downwards.

At an attachment end 24c of the holding tab 24b, which faces away from the holding part base 24a, the end 18a of the valve actuator 18 is attached.

The actuating part 22 now also is constructed differently and comprises an actuating part frame 22a with a valve-element-side frame part 22b and a frame part 22c facing away from the valve element 26.

The frame part 22c is connected to the end 18b of the valve actuator 18.

In addition, the actuating part 22 is urged in the direction of the adjusting device 28 by means of a spring 52, i.e. upwards in the representation of FIG. 4.

The valve actuator 18, and hence the elastomer transducer 20, extend between the attachment end 24c and the frame part 22c.

In the second embodiment, the elastomer transducer 20 is designed such that it expands upon energization.

Consequently, the valve according to the second embodiment also is a so-called normally closed (NC) valve. In a non-energized state of the valve actuator 18, the valve 10 is thus closed (see the representation in FIG. 4).

Only when the valve actuator 18 is lengthened due to an energization, the actuating part 22 can move upwards from the position shown in FIG. 4 by utilizing the force of the spring 52 and thus open the valve 10.

The adjusting device 28 and its cooperation with the holding part 24 and the connecting element 42 correspond to the first embodiment.

The invention claimed is:

1. A valve drive comprising a housing in which a valve actuator with a dielectric elastomer transducer is arranged, which operates along an active axis,
    wherein a first end of the valve actuator is coupled to an actuating part for actuating a valve element and a second end of the valve actuator, which is opposite to the first end, is coupled to a holding part which is mounted in the housing,
    wherein the holding part is mounted in the housing via an adjusting device for adjusting a mechanical pretension of the dielectric elastomer transducer, wherein the adjusting device includes a single adjusting screw, and
    wherein the holding part is magnetically connected to the adjusting screw in a second direction, which is oriented along the active axis of the dielectric elastomer transducer.

2. The valve drive of claim 1, wherein a middle axis of the adjusting screw substantially coincides with the active axis of the dielectric elastomer transducer.

3. The valve drive of claim 1, wherein the holding part is shiftably mounted with respect to the housing via a sliding guideway.

4. The valve drive of claim 3, wherein the sliding guideway acts as an anti-rotation protection for the dielectric elastomer transducer.

5. The valve drive of claim 1, wherein the adjusting screw cooperates with the housing via a thread.

6. The valve drive of claim 1, wherein the holding part rests against the adjusting screw in a first direction, which is oriented along the active axis of the dielectric elastomer transducer.

7. The valve drive of claim 1 the second direction is opposite to a first direction and a direction of pretension of the dielectric elastomer transducer.

8. The valve drive of claim 1, wherein the adjusting screw comprises a magnetizable portion, and the holding part comprises a permanent-magnetic portion or a permanent-magnetic connecting element attached to the holding part, wherein the permanent-magnetic portion or the permanent-magnetic connecting element is magnetically connected to the magnetizable portion, or that the adjusting screw comprises a permanent-magnetic portion, and the holding part comprises a magnetizable portion or a magnetizable connecting element attached to the holding part, wherein the permanent-magnetic portion is magnetically connected to the magnetizable portion or the magnetizable connecting element.

9. The valve drive of claim 7, wherein the adjusting screw is made of a magnetizable material.

10. A valve comprising a valve drive as defined in claim 1.

11. A valve drive comprising a housing in which a valve actuator with a dielectric elastomer transducer is arranged, which operates along an active axis,
    wherein a first end of the valve actuator is coupled to an actuating part for actuating a valve element and a second end of the valve actuator, which is opposite to the first end, is coupled to a holding part which is mounted in the housing,
    wherein the holding part is mounted in the housing via an adjusting device for adjusting a mechanical pretension of the dielectric elastomer transducer, wherein the adjusting device includes a single adjusting screw, and
    wherein the adjusting screw includes a magnetizable portion, and the holding part includes a permanent-magnetic portion or a permanent-magnetic connecting element attached to the holding part, wherein the permanent-magnetic portion or the permanent-magnetic connecting element is magnetically connected to the magnetizable portion.

12. A valve drive comprising a housing in which a valve actuator with a dielectric elastomer transducer is arranged, which operates along an active axis,
    wherein a first end of the valve actuator is coupled to an actuating part for actuating a valve element and a second end of the valve actuator, which is opposite to the first end, is coupled to a holding part which is mounted in the housing,
    wherein the holding part is mounted in the housing via an adjusting device for adjusting a mechanical pretension of the dielectric elastomer transducer, wherein the adjusting device includes a single adjusting screw, and
    wherein the adjusting screw includes a permanent-magnetic portion, and the holding part includes a magnetizable portion or a magnetizable connecting element attached to the holding part, wherein the permanent-magnetic portion is magnetically connected to the magnetizable portion or the magnetizable connecting element.

\* \* \* \* \*